Oct. 18, 1927.
W. AUGENSTEIN
FACET CUTTING MACHINE
Filed Aug. 18, 1924
1,646,375
2 Sheets-Sheet 1
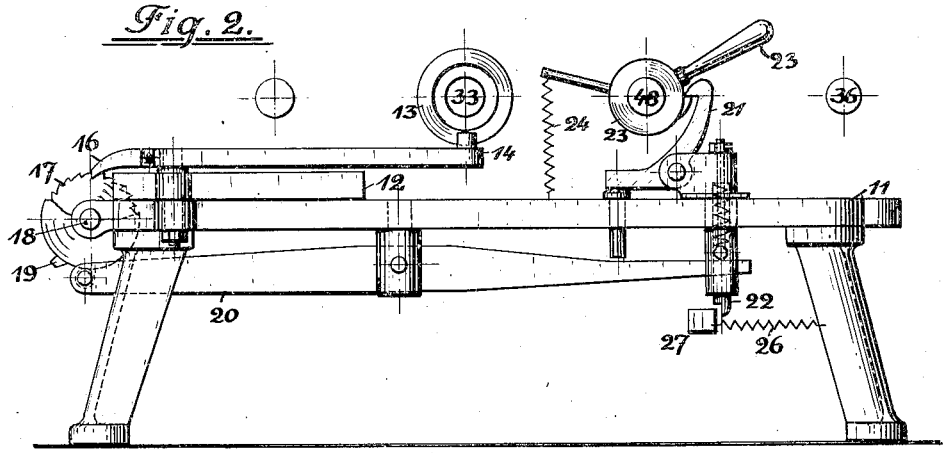
Fig. 2.
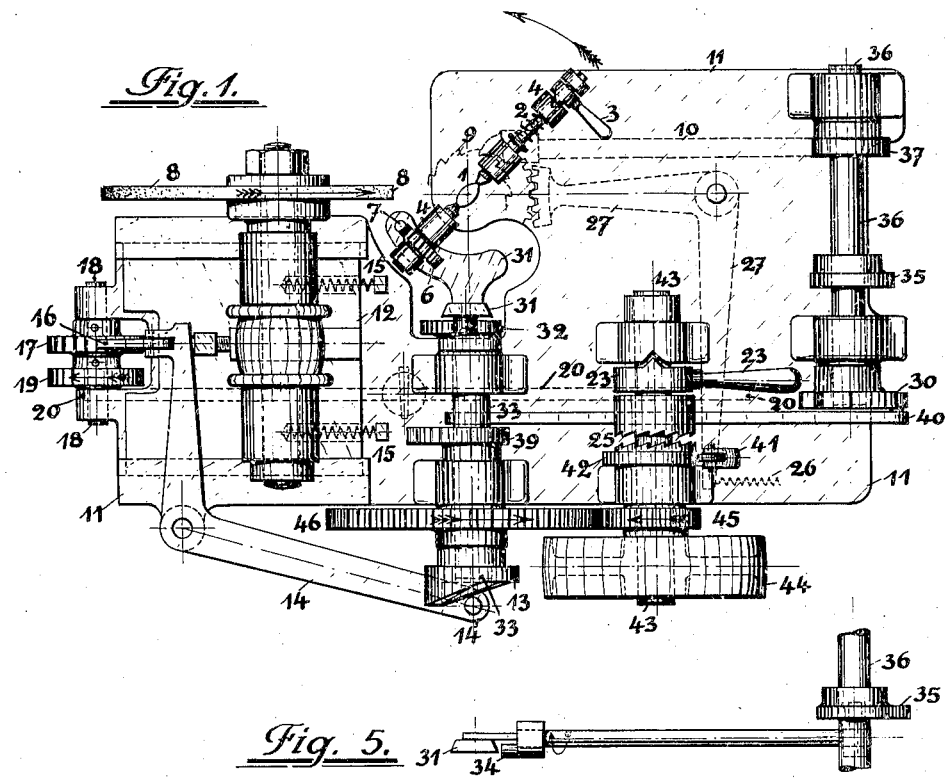
Fig. 1.
Fig. 5.
Inventor
Wilhelm Augenstein Oct. 18, 1927.  
W. AUGENSTEIN  
FACET CUTTING MACHINE  
Filed Aug. 18, 1924  
1,646,375  
2 Sheets-Sheet 2
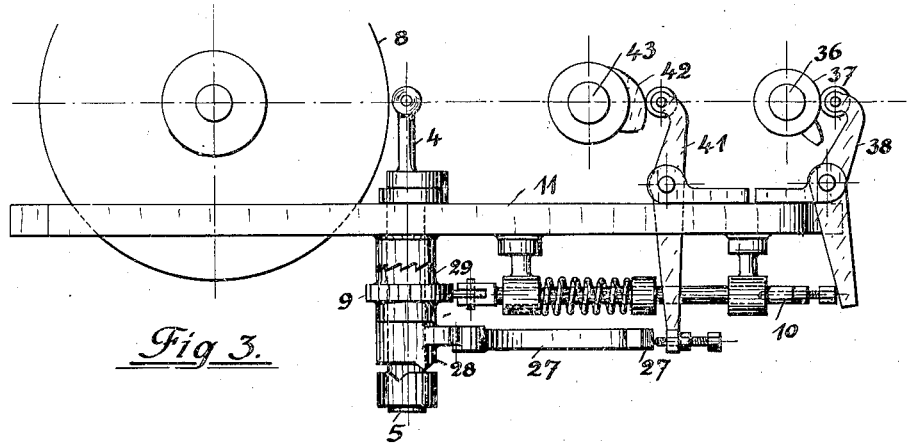
Fig. 3.
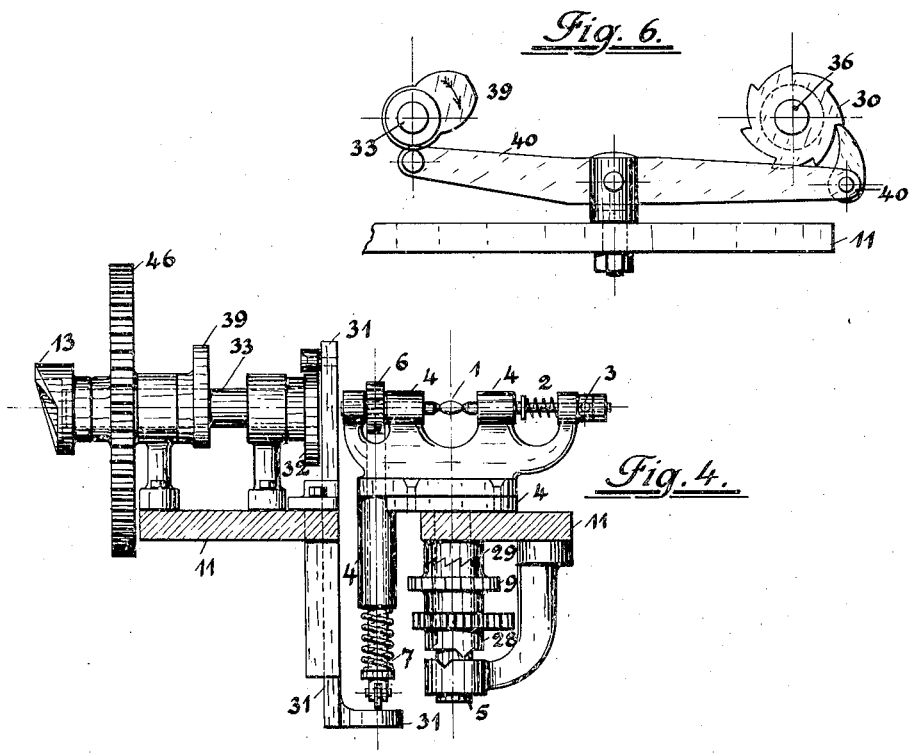
Fig. 6.
Fig. 4.

Patented Oct. 18, 1927.

1,646,375

UNITED STATES PATENT OFFICE.

WILHELM AUGENSTEIN, OF ELLMENDINGEN, GERMANY.

FACET-CUTTING MACHINE.

Application filed August 18, 1924, Serial No. 732,804, and in Germany May 7, 1923.

This invention relates to a machine for automatically cutting facets in staggered rows into the surfaces of articles made from amber, artificial horn, glass or the like. The machine works in such a manner that when a hand lever is depressed the work, to be cut, is gripped by a clamping device whereupon the grinding stone, which executes a reciprocating movement, cuts the desired number of facets into the work which is fed and rotated by gear wheels, whereupon the machine is automatically stopped. The number of facets cut corresponds with the number of teeth on the exchangeable feed wheels.

The invention consists in the characteristic features set forth in the claims.

The improved machine is illustrated by way of example in the accompanying drawings in six figures.

Fig. 1 is a plan view.

Figs 2, 3 and 4 are side elevations.

Fig. 5 shows in plan view the mechanism for feeding the work of half the distance between facets at the changing of the row.

Fig. 6 shows in elevation the driving mechanism for the mechanism shown in Fig. 5.

It is supposed that 28 facets have to be cut into an egg-shaped work e. g. 4 facets in meridional direction and 7 facets in the latitude direction of the work.

The work 1 is placed into the clamping device 2 which is operated by a hand-lever 3. The clamping device 2 is mounted in a bracket 4 adapted to pivot around its vertical axle 5. The clamping device 2 is adapted to rotate around its horizontal axis and it is operated from the feed gear wheel 6.

The feed gear wheel 6 mounted on the horizontal axle of the clamping device has 14 teeth and it is rotated intermittently of two teeth at a time by a pawl mounted on the upper end of a feed rod 7.

The feed rod 7 is operated by a slide 31 having a horizontal abutment face at its end and moved up and down from a cam disk 32 keyed on a shaft 33. The shaft 33 is driven from a pulley 44 on the main shaft 43 through the intermediary of gear wheels 45, 46.

A grinding wheel 8 is mounted on a carriage 12 slidable on the frame plate 11 of the machine. The grinding wheel 8 is moved, after every feeding movement of the clamping mechanism, towards the work 1 through the intermediary of an elbow lever 14 controlled by a cam disk 13. Retraction springs 15 serve for returning the grinding wheel 8 into the initial position. The grinding wheel 8 is driven by a separate belt drive.

When, in this manner, seven facet faces have been cut on the work 1 the bracket 4 together with the work 1 is moved for the distance of one tooth with the aid of a feed wheel 9 and feed mechanism. This feed mechanism consists of a feed rod 10 having a pawl which engages with feed wheel 9, said rod 10 being driven by a two armed lever 38 (Fig. 3) which is oscillated by a cam disk 37 keyed on an axle 36. This axle 36 is rotated by a feed wheel 30 having seven teeth (according to the seven facets to be cut). The feed wheel 30 is rotated by a pawl pivotally mounted on one end of a two-armed lever 40 controlled by a cam disk 39 keyed on the shaft 33.

As the facets of two adjacent rows are displaced with regard to one another so that the facets in one row stand opposite the intervals between the facets in the other row the work 1 must be moved, for changing the row in the latitude direction, not of two but only of one tooth of feed disk 6. With this object in view an abutment on slide 31 co-operates with a cam 34 (Fig. 5) so that this slide cannot descend to the lowest position but is stopped at the middle of its descending movement. When the feed rod 7 ascends again it executes only half a feeding movement and makes the wheel 6 rotate one tooth only. The cam 34 is mounted on an axle underneath the plate 11 and it is operated by a similar cam on the other end of its axle said second cam being controlled by an eccentric keyed on shaft 36.

When in this manner four rows, each of seven facets, have been cut and the work has been faceted over its entire circumference the machine is automatically stopped. With this object in view a feed wheel 17 keyed on a shaft 18 is rotated by a pawl 16 at the rear end of the elbow lever 14 which operates the grinding wheel 8. The feed wheel 17 has twenty-eight teeth according to the twenty-eight facets to be cut so that it has completed one revolution after twenty-eight to and fro movements of the elbow lever. At this moment a nose 19 of a cam disk keyed on the shaft 18 acts upon a two armed lever 20 so that the other end of this lever disengages a pawl 21 and an abutment 22. The pawl 21 releases a starting lever 23 which is turned through the action of a spring 24 so that a nose on the hub of the lever 23 engages with a notch in the adjacent bearing, a toothed clutch coupling 25 designed to transmit the rotation of the driving pulley 44 upon the machine being uncoupled so that the machine is stopped.

The abutment 22 operated by the lever 20 releases an elbow lever 27 which under the action of a spring 26 is moved so that a toothed segment at the other end of said elbow lever 27 rotates a toothed segment on the vertical axle of the bracket 4. In this position of the second mentioned toothed segment a nose of this segment engages with a notch in the lug of the bearing whereby the toothed coupling clutch which transmits the rotation of feed wheel 9 upon the work 1 is uncoupled and the bracket brought into its initial position by the pull exerted by a counterweight.

The finished work is removed and a fresh work inserted, whereupon the machine is started again by depression of lever 23, in opposition to the spring 24. The lever 23 is pressed down until the nose on its hub is held by pawl 21. The second nose on the hub of lever 23 is moved out of the notch in the bearing whereby the clutch coupling 25 is coupled and the machine is started. At the depression of lever 23 a cam disk on axle 43 is rotated so that its cam 42 actuates the two-armed lever which makes the elbow lever 27 oscillate so that by the toothed segment of this elbow lever the clutch coupling 29 for the bracket 4 is coupled.

To cut any other number of facets the feed wheels 6, 9, 17 and 30 have to be exchanged against feed wheels with another corresponding number of teeth.

I claim—

1. A facet cutting machine comprising in combination a main driving shaft, a spring controlled bracket, two horizontal spring controlled clamping spindles for holding the work and rotatably mounted in said bracket, a feed wheel having a predetermined number of teeth, for instance 14, keyed on one of said spindles, a vertical spring controlled feed rod, a pawl on the upper end of said feed rod for intermittently rotating said feed wheel, a slide for intermittently lifting said feed rod, a cam disk operating said slide and driven from said main driving shaft, a grinding wheel, means for alternately advancing said grinding wheel towards the work advancing the same, a vertical axle for said bracket, a feed wheel on said vertical axle, means for intermittently rotating said feed wheel on said vertical axle of an angle corresponding to the distance between two facets to be cut on the work, a feed wheel having 7 teeth controlling said driving means for said vertical axle, and means for rotating said feed wheel with 7 teeth from the main shaft in accordance with said means for shifting said grinding wheel so that said feed wheel is rotated when said grinding wheels moves away from the work.

2. A facet cutting machine comprising in combination a main driving shaft, a spring controlled bracket, two horizontal spring controlled clamping spindles for holding the work and rotatably mounted in said bracket, a feed wheel having a predetermined number of teeth, for instance 14, keyed on one of said spindles, a vertical spring controlled feed rod, a pawl on the upper end of said feed rod for intermittently rotating said feed wheel, a slide for intermittently lifting said feed rod, a cam disk operating said slide and driven from said main driving shaft, a grinding wheel, means for alternately advancing said grinding wheel towards the work advancing the same, a vertical axle for said bracket, a feed wheel on said vertical axle, means for intermittently rotating said feed wheel on said vertical axle of an angle corresponding to the distance between two facets to be cut on the work, a feed wheel having 7 teeth controlling said driving means for said vertical axle, means for rotating said feed wheel with 7 teeth from the main shaft in accordance with said means for shifting said grinding wheel so that said feed wheel is rotated when said grinding wheel moves away from the work, and a mechanism for stopping half way the movement of said slide for operating said feed rod after seven facets have been cut so that the work is advanced for half the normal distance after the part rotation of the work at the beginning of a new row of facets.

In testimony whereof I affix my signature.

WILHELM AUGENSTEIN.